United States Patent [19]

Van Der Veen

[11] Patent Number: 5,519,708
[45] Date of Patent: May 21, 1996

[54] SYSTEM FOR CONVERTING SYNCHRONOUS TIME-DIVISION SIGNALS INTO ASYNCHRONOUS TIME-DIVISION DATA PACKETS

[75] Inventor: Hendrik Van Der Veen, Hilversum, Netherlands

[73] Assignee: U.S. Philips Corporation, New York, N.Y.

[21] Appl. No.: 427,782

[22] Filed: Apr. 17, 1995

Related U.S. Application Data

[63] Continuation of Ser. No. 901,457, Jun. 19, 1992, abandoned.

[30] Foreign Application Priority Data

Jun. 21, 1991 [EP] European Pat. Off. ............. 91201596

[51] Int. Cl.$^6$ ........................................................ H04J 3/22
[52] U.S. Cl. ............................................. 370/942; 370/99
[58] Field of Search ............................. 370/94.1, 79, 99, 370/60, 112, 94.2, 94.3

[56] References Cited

U.S. PATENT DOCUMENTS

| | | | |
|---|---|---|---|
| 4,603,416 | 7/1986 | Servel et al. | 370/60 |
| 4,612,636 | 9/1986 | Grover et al. | 370/94.1 |
| 4,862,451 | 8/1989 | Closs et al. | 370/60 |
| 4,884,264 | 11/1989 | Servel et al. | 370/60 |
| 5,083,269 | 1/1992 | Syobatuke et al. | 370/60 |
| 5,144,619 | 9/1992 | Munter | 370/94.2 |
| 5,212,686 | 5/1993 | Joy et al. | 370/60 |
| 5,224,099 | 6/1993 | Corbalis et al. | 370/94.2 |

Primary Examiner—Benedict V. Safourek
Assistant Examiner—Ajit Patel
Attorney, Agent, or Firm—Michael J. Balconi-Lamica; David Schreiber

[57] ABSTRACT

System for converting synchronous time-division (STD) signals into asynchronous data packets (ATD), in which the incoming and outgoing signals are spread over various (multiplex) channels. Not more than a single RAM and a single FIFO are utilized for various channels together. The RAM is subdivided into rows and columns, one column per channel, data packets being preferably stored in successive columns shifted by at least 1 row.

4 Claims, 1 Drawing Sheet

SYSTEM FOR CONVERTING SYNCHRONOUS TIME-DIVISION SIGNALS INTO ASYNCHRONOUS TIME-DIVISION DATA PACKETS

This is a continuation of application Ser. No. 07/901,457, filed Jun. 19, 1992 abandoned.

BACKGROUND OF THE INVENTION

The invention relates to a system for processing synchronous time-division (STD) signals as well as asynchronous time-division (ATD) data packets, in which input signals spread over various input channels are converted into output signals spread over various output channels, in response to control means the input signals being temporarily stored in a first-in first-out (FIFO) memory and read out therefrom, and are also temporarily stored in a RAM and read out therefrom as well.

A similar system is known from U.S. Pat. No. 4,612,636. In the system described in that Patent asynchronous data packets comprising each a header with a channel address for which the packet information is intended, as well as two information bytes, are stored in a FIFO (first-in first-out buffer). The header of the asynchronous data packets determines a memory location in a RAM at which the information bytes are then stored. Each memory location is coupled to a specific output channel. The RAM memory locations associated to an output channel (for example, a time channel in a multiplex signal) are read out cyclically, so that the information concerned appears on an output line as a signal, possibly in multiplex form, synchronized with other channels. The asynchronous data packets applied to the system are also spread over various channels (possibly multiplex channels). The use of a FIFO in combination with a RAM avoids that a FIFO and a control is necessary for each channel.

A drawback of the prior-art system is that it is only suitable for converting asynchronous data packets into synchronous multiplex signals, whereas there is also a need for a system converting synchronous time-division signals into asynchronous time-division data packets.

SUMMARY OF THE INVENTION

It is an object of the invention to adapt the prior-art system, so that a system is developed convening synchronous time-division signals into asynchronous time-division data packets.

The system according to the invention is thereto characterized, in that the input signals are the STD signals, the output signals are the ATD packets and the STD signals are first stored in the RAM before being placed in the FIFO.

With these measures the state-of-the-art problems are avoided.

This provides an optimum time-division packet handling with minimum hardware.

BRIEF DESCRIPTION OF THE DRAWINGS

The invention will be further explained with reference to a drawing Figure which is merely intended to be used for illustrative purposes and is not to be regarded as a restriction, in which:

FIG. 1 shows a system for converting time-division synchronous signals into asynchronous time-division data packets and FIG. 2 shows a memory layout of the RAM in the system shown in FIG. 1.

DETAILED DESCRIPTION OF THE PREFERRED EMBODIMENT

FIG. 1 shows a system 100 for converting a synchronous time-division signal referenced STD signal (Synchronous Time-Division), into an asynchronous data packet referenced ATD packet (Asynchronous Time-Division).

The incoming STD signal is transported to a RAM 102 in response to a RAM input control 107 through a series-to-parallel converter 101. If the latter is not explicitly included, synchronizing means 108 derive time synchronizing information from the incoming channels. The series-to-parallel converter 101 has for its function to carry out the data processing at a lower rate. Various input channels, for example, in the form of multiplex time-division channels, can be connected to the system shown in FIG. 1. The RAM 102 has such a memory structure that a column is reserved for each incoming channel, with each column comprising a number of rows for individual information packets.

In response to a RAM-to-FIFO control 106 the information is taken from the columns of the RAM 102 to a FIFO memory 103 (First In First Out), where a header identifying the destination of the data packet is affixed to the data packet. The FIFO 103 has an independent access for read and write operations and is used for the desired rate adjustments. The RAM input control 107 knows about the organization of the input channels, for example, 32 channels of 64 kbit/s and, on the basis thereof, fills the RAM memory locations. This should be effected in such a way that the complete data packets for the different output channels are finished is effected in a time-division mode. In that case the data transfer control is loaded as uniformly as possible and the formation of data packets for the different output channels is delayed the least possible.

The RAM-m-FIFO control 106 comprises, for example, a table of headings for each column in the RAM. The table of headings itself is controlled by a PD control 109 which includes an error detection section. The header comprises, for example, a transfer bit denoting whether a specific output channel is to be supplied with a data packet. The RAM-to-FIFO control 106 continuously scans the rows in the RAM 102. If a sufficient number of rows in a column are filled for assembling a data packet, the RAM-to-FIFO control 106 places a header in the FIFO 103 and adds in the fastest way possible the relevant contents of the column to the header, unless the transfer bit of the header has a zero value. Subsequent to the transfer to the FIFO 103, a signal is sent to a FIFO output control 105, which in its turn transfers the data packets located in the FIFO 103 to a parallel-to-series converter 104 and then to the ATD output channels while maintaining the desired synchronization.

In the present system the manner in which the RAM 102 is arranged is of importance. Each column comprises as many rows as is strictly necessary for storing a data packet. In the case where a data packet comprises N bytes, each column in the RAM comprises exactly N-byte memory locations. If the write pointer, whose position is generated by the RAM input control 107, is at the end of these N memory locations, a data packet is full. The RAM-FIFO control 106 then receives from the RAM input control 107 the associated column address for addressing the desired output channel, and transfers the data packet concerned to the FIFO 103. This transfer is to be effected as soon as possible, but is to be completed before the next information byte for the associated column arrives.

FIG. 2 shows, for example, that packet (x+1) of column 4 is full (the write pointer has a value N). This packet is to be transported to the FIFO before the arrival of the next information byte for column 4.

It should be observed that the previously terminated packet was packet (x+2) of column 5 and, therefore, the reading of the packet from this column 5 had certainly been terminated before said next information byte for column 4 arrived.

The information-from this column has thus already been transported to the FIFO and the first byte of the new packet can be written in the zero$^{th}$ row.

Figure 1:
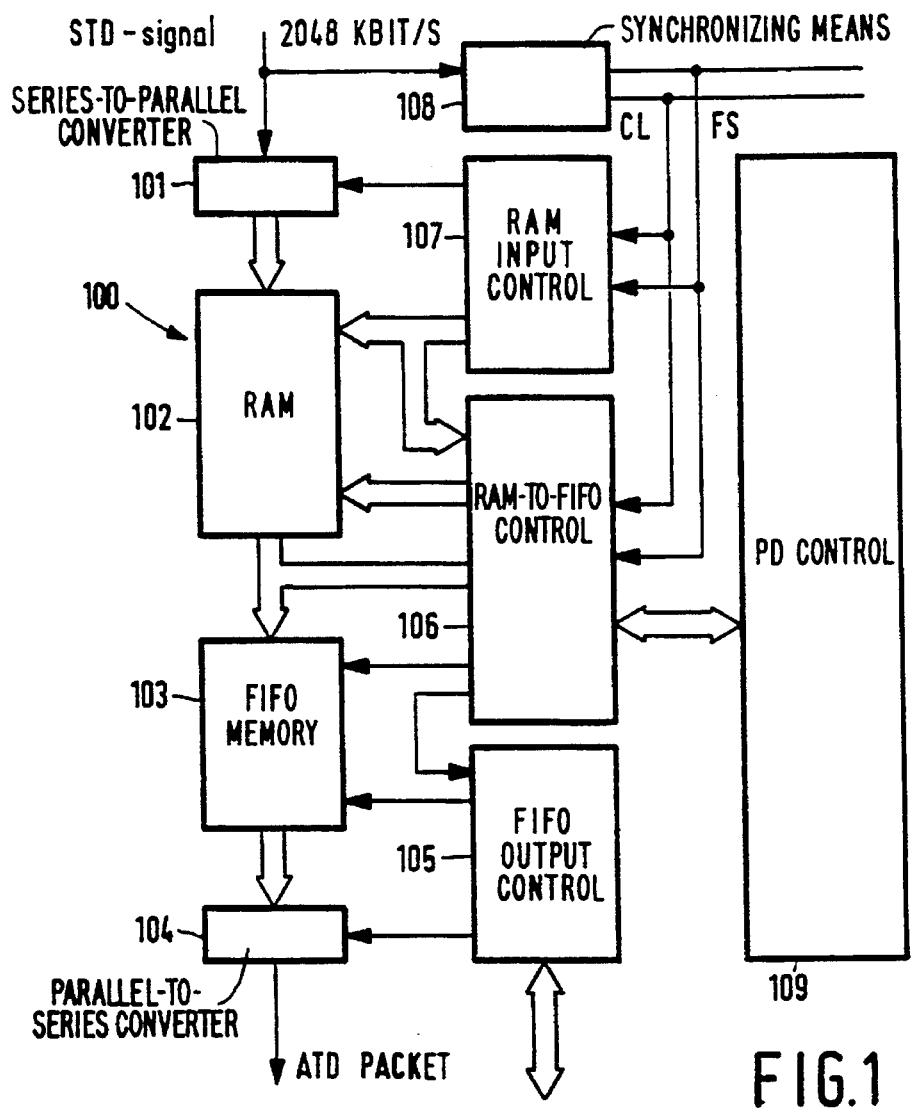
Figure 2:
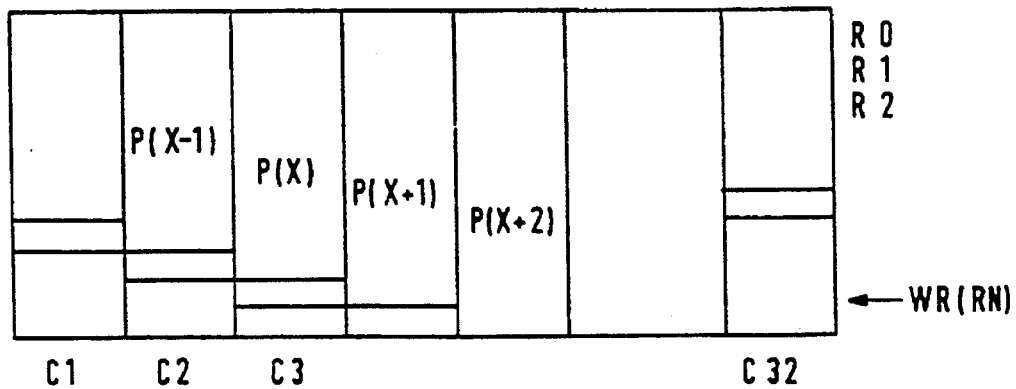

In an extremely advantageous embodiment of the invention the synchronous signals are shifted per column row (e.g. 1 row) in the memory matrix of rows and columns as is shown in FIG. 2. If in the first column C1, for example, the filling of a data packet is commenced in the zero$^{th}$ row R0, this is commenced in the i$^{th}$ column C1 on the (i-1)st row R(i-1). The row-shifted data packet storage in the RAM ensures that the data packets become available efficiency divided over time. An extremely efficient data packet transfer to the FIFO may therefore be effected. A minimum-size FIFO may also suffice, because the transfer is effected uniformly divided over time. Each filled data packet will be presented to the FIFO with the same (minimum) time delay.

What is claimed is:

1. A system for converting a synchronous time-division signal into an asynchronous time-division data packet, comprising:

first storage means having an input for receiving the synchronous time-division signal, said first storage means further having an output, wherein said first storage means is a random access memory divided into columns and rows, wherein each column of the random access memory corresponds to an asynchronous time-division data packet and each row of the column corresponds to a byte of the asynchronous time-division data packet;

second storage means having an input for receiving the synchronous time-division signal from said first storage means, said second storage means further having an output; and control means for sending an address signal to said second storage means for converting the synchronous time-division signal into the asynchronous time-division data packet, wherein the synchronous time-division signal is transmitted from the random access memory to said second storage means when a predetermined number of rows in a column of the random access memory have received the time-division signal.

2. The system as claimed in claim 1, wherein the address signal is a header and wherein said control means transmits the header to said second storage means.

3. The system as claimed in claim 1, wherein the address signal is a packet header and wherein said control means transmits the packet header to said second storage means, the packet header being combined with the synchronous time-division signal in said second storage means to form the asynchronous time-division data packet.

4. The system as claimed in claim 2, wherein said second storage means is a first-in first-out memory.

* * * * *